(12) United States Patent
Rylander et al.

(10) Patent No.: US 12,052,941 B2
(45) Date of Patent: Aug. 6, 2024

(54) SYSTEM AND METHOD FOR CALIBRATING TOOL DEPTH OF AN AGRICULTURAL IMPLEMENT BASED ON FRAME POSITION

(71) Applicant: CNH Industrial America LLC, New Holland, PA (US)

(72) Inventors: Douglas James Rylander, La Salle, IL (US); Trevor Stanhope, Palos Hills, IL (US); Joshua David Harmon, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 722 days.

(21) Appl. No.: 16/721,049

(22) Filed: Dec. 19, 2019

(65) Prior Publication Data

US 2021/0185884 A1 Jun. 24, 2021

(51) Int. Cl.
*A01B 79/00* (2006.01)
*A01B 63/111* (2006.01)
*A01B 63/114* (2006.01)
*A01B 63/22* (2006.01)
*A01B 63/32* (2006.01)
*A01B 49/02* (2006.01)

(52) U.S. Cl.
CPC ........ *A01B 79/005* (2013.01); *A01B 63/1112* (2013.01); *A01B 63/114* (2013.01); *A01B 63/22* (2013.01); *A01B 63/32* (2013.01); *A01B 49/027* (2013.01)

(58) Field of Classification Search
CPC ..... A01B 63/22; A01B 63/32; A01B 63/1112; A01B 63/114; A01B 79/005
See application file for complete search history.

(56) References Cited

U.S. PATENT DOCUMENTS

| 4,031,963 | A | | 6/1977 | Poggemiller et al. |
| 4,600,060 | A | | 7/1986 | Winter et al. |
| 4,723,608 | A | * | 2/1988 | Pearson ................. A01B 63/22 |
| | | | | 172/430 |
| 6,076,611 | A | * | 6/2000 | Rozendaal et al. .... A01B 63/22 |
| | | | | 172/474 |
| 6,164,385 | A | | 12/2000 | Buchl |

(Continued)

*Primary Examiner* — Thomas B Will
*Assistant Examiner* — Joel F. Mitchell
(74) *Attorney, Agent, or Firm* — Rebecca Henkel; Peter K. Zacharias; Rickard K. DeMille

(57) ABSTRACT

A system for calibrating tool depth as an agricultural implement is moved across a field may include an implement frame and a ground-engaging tool supported on the implement frame, with the ground-engaging tool configured to penetrate soil present within the field to a penetration depth. Additionally, the system may also include a frame position sensor configured to capture data indicative of a distance between the implement frame and a surface of the field. Furthermore, a controller of the disclosed system may be configured to determine a penetration depth value of the ground-engaging tool based on a received input. Moreover, the controller may be configured to determine a correction factor based on the data captured by the frame position sensor. In addition, the controller may be configured to adjust the determined penetration depth value based on the determined correction factor to calibrate the penetration depth value.

13 Claims, 4 Drawing Sheets

(56) References Cited

U.S. PATENT DOCUMENTS

| | | |
|---|---|---|
| 6,701,857 B1 | 3/2004 | Jensen et al. |
| 6,971,452 B2 | 12/2005 | Ocsenknecht et al. |
| 7,743,718 B2 | 6/2010 | Bassett |
| 8,636,077 B2 | 1/2014 | Bassett |
| 8,857,530 B2 | 10/2014 | Henry |
| 9,433,142 B2 | 9/2016 | Bergen et al. |
| 9,572,296 B2 | 2/2017 | Henry et al. |
| 9,814,172 B2 | 11/2017 | Achen et al. |
| 10,262,413 B2 | 4/2019 | Strnad et al. |
| 10,440,876 B2 * | 10/2019 | Sporrer et al. ......... A01B 63/14 |
| 10,827,665 B2 * | 11/2020 | Sporrer et al. ....... A01B 63/008 |
| 10,939,604 B2 * | 3/2021 | Sporrer et al. ...... A01B 63/1115 |
| 2008/0257569 A1 * | 10/2008 | Foster et al. ......... A01B 63/145 |
| | | 172/7 |
| 2008/0257570 A1 | 10/2008 | Keplinger et al. |
| 2018/0153088 A1 * | 6/2018 | Sporrer et al. ....... A01B 63/008 |
| 2018/0206393 A1 | 7/2018 | Stoller et al. |
| 2019/0166762 A1 * | 6/2019 | Wu et al. .............. A01B 63/111 |
| 2019/0254223 A1 * | 8/2019 | Eichhorn et al. ...... A01B 63/16 |

\* cited by examiner

SYSTEM AND METHOD FOR CALIBRATING TOOL DEPTH OF AN AGRICULTURAL IMPLEMENT BASED ON FRAME POSITION

FIELD OF THE INVENTION

The present disclosure generally relates to agricultural implements and, more particularly, to systems and methods for calibrating the penetration depths of one or more ground-engaging tools of an agricultural implement based on frame position.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground-engaging tools (e.g., a shank(s), a disk blade(s), a harrow tine(s), and/or a leveling blade(s)) supported on its frame that are configured to loosen and/or otherwise agitate the soil to prepare the field for subsequent planting operations.

When performing a tillage operation, it is generally desirable to create a layer of tilled soil having a specified depth across the field to form a proper seedbed for subsequent planting operations. In this respect, before performing a tillage operation, an operator may adjust the position(s) of the ground-engaging tool(s) relative to the implement frame such that the tool(s) penetrate the soil to the specified penetration depth. Such adjustments are typically performed on a hard level (e.g., paved) surface. However, when the implement travels across the field, the soil may generally exert a downward force on the tool(s). The force may, in turn, compress the tires of the implement and/or pull the tires into the soil such that the penetration depth of the tool(s) is greater than the specified depth.

Accordingly, an improved system and method for calibrating tool depth of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for calibrating tool depth as an agricultural implement is moved across a field. The system may include an implement frame and a ground-engaging tool supported on the implement frame, with the ground-engaging tool configured to penetrate soil present within the field to a penetration depth. Additionally, the system may also include a frame position sensor configured to capture data indicative of a distance between the implement frame and a surface of the field. Furthermore, the system may include a controller communicatively coupled to the frame position sensor. As such, the controller may be configured to determine a penetration depth value of the ground-engaging tool based on a received input. Moreover, the controller may be configured to determine a correction factor based on the data captured by the frame position sensor. In addition, the controller may be configured to adjust the determined penetration depth value based on the determined correction factor to calibrate the penetration depth value.

In another aspect, the present subject matter is directed to a tillage implement. The tillage implement may include a frame, a plurality of wheels adjustably coupled to the frame, and a first ground-engaging tool supported on the frame. The first ground-engaging tool may, in turn, be configured to penetrate soil present within the field to a first penetration depth. Additionally, the tillage implement may include a frame position sensor configured to capture data indicative of a distance between the frame and a surface of the field. Furthermore, the tillage implement may include a controller communicatively coupled to the frame position sensor. As such, the controller may be configured to determine a first penetration depth value of the first ground-engaging tool based on a received input. Moreover, the controller may be configured to determine a correction factor based on the data captured by the frame position sensor. In addition, the controller may be configured to adjust the first penetration depth value based on the determined first correction factor to calibrate the first penetration depth value.

In a further aspect, the present subject matter is directed to a method for calibrating tool depth as an agricultural implement is moved across a field. The agricultural implement may include a frame and a ground-engaging tool supported on the frame, with the ground-engaging tool configured to penetrate soil present within the field to a penetration depth. The method may include determining, with one or more computing devices, a penetration depth value of the ground-engaging tool based on a received input. Furthermore, the method may include determining, with the one or more computing devices, a correction factor based on frame position sensor data indicative of a distance between the frame and a surface of the field. Additionally, the method may include adjusting, with the one or more computing devices, the determined penetration depth value based on the determined correction factor to calibrate the penetration depth value.

These and other features, aspects and advantages of the present technology will become better understood with reference to the following description and appended claims. The accompanying drawings, which are incorporated in and constitute a part of this specification, illustrate embodiments of the technology and, together with the description, explain the principles of the technology.

BRIEF DESCRIPTION OF THE DRAWINGS

A full and enabling disclosure of the present technology, including the best mode thereof, directed to one of ordinary skill in the art, is set forth in the specification, which refers to the appended figures, in which.

Figure 1:
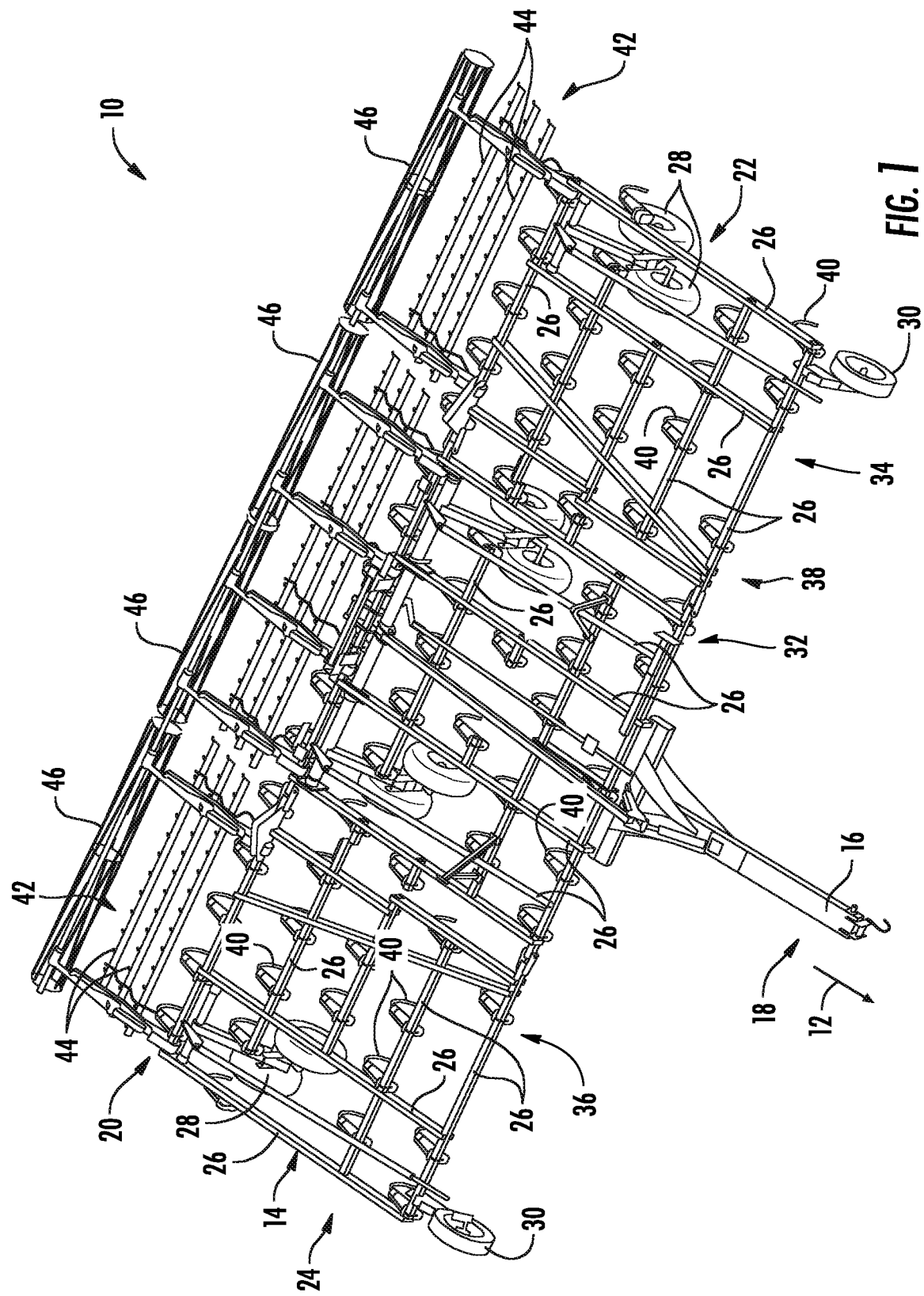
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for calibrating tool depth of an agricultural implement. More specifically, prior to the performance of an agricultural operation (e.g., a tillage operation), the operator of the agricultural implement may adjust the position(s) of one or more ground-engaging tools (e.g., a shank(s)) relative to a frame of the implement such that the tool(s) penetrate the surface of the field to a desired or specified penetration depth. In this respect, a controller of the disclosed system may be configured to receive an input indicative of such penetration depth of the tool(s). For example, in one embodiment, the input may be received from one or more wheel position sensors configured to capture data indicative of the position of a wheel(s) of the implement relative to the frame. In another embodiment, the input may be received from the operator (e.g., via a user interface). Thereafter, the controller may be configured to determine a penetration depth value(s) of the tool(s) based on the received input.

In accordance with aspects of the present subject matter, the controller may be configured to calibrate the determined penetration depth value(s) of the ground-engaging tool(s). As the implement travels across the field to perform the agricultural operation thereon, the soil within the field may exert a downward force on the ground-engaging tool(s), thereby compressing the tires of the implement and/or pulling the wheels/tires into the soil. Thus, the determined penetration depth value(s) may be shallower than the actual penetration depth(s) of the ground-engaging tools(s). As such, the system may include one or more frame position sensors (e.g., a non-contact-based sensor(s), such as an ultrasonic sensor(s) or a RADAR sensor(s)) configured to capture data indicative of the distance between the implement frame and the surface of the field. In this respect, the controller may be configured to determine a correction factor for the determined penetration depth value(s) of the ground-engaging tool(s) based on the data captured by the frame position sensor(s). Thereafter, the controller may be configured to adjust the determined penetration depth value(s) based on the determined correction factor to calibrate the penetration depth value(s).

Thus, the disclosed systems and methods enable a more accurate determination of the penetration depths of the ground-engaging tools of an agricultural implement, which improves control of the implement to obtain desired seedbed conditions within a field and, as a result, leads to superior agricultural outcomes.

Referring now to the drawings, FIG. 1 illustrates a perspective view of the agricultural implement 10 in accordance with aspects of the present subject matter. In general, the implement 10 may be configured to be towed across a field in a direction of travel (indicated by arrow 12) by a suitable work vehicle (not shown), such as an agricultural tractor. As shown, the implement 10 may be configured as a tillage implement, such as a field cultivator. However, in other embodiments, the implement 10 may be configured as any other suitable type of implement, such as another type of tillage implement, a seed-planting implement, a fertilizer-dispensing implement, and/or the like.

As shown in FIG. 1, the implement 10 may include the frame 14 configured to be towed by the work vehicle via a pull hitch or tow bar 16 in the direction of travel 12. As shown, the frame 14 may extend longitudinally between a forward end 18 and an aft end 20. The frame 14 may also extend laterally between a first side 22 and a second side 24. In this respect, the frame 14 generally includes a plurality of structural frame members 26, such as beams, bars, and/or the like, configured to support or couple to a plurality of components. Additionally, as will be described below, a plurality of wheels may be coupled to the frame 14, such as a set of centrally-located wheel assemblies 28 and a set of front pivoting wheel assemblies 30, to facilitate towing the implement 10 in the direction of travel 12.

Furthermore, the frame 14 may include a plurality of sections. As shown in FIG. 1, for example, the frame 14 may include a main section 32 positioned centrally between the first and second sides 22, 24 of the frame 14. Moreover, the frame 14 may also include a first wing section 34 positioned proximate to the first side 22 of the frame 14. Similarly, the frame 14 may also include a second wing section 36 positioned proximate to the second side 24 of the frame 14. The first and second wing sections 34, 36 may be pivotably coupled to the main section 32 of the frame 14. In this respect, the first and second wing sections 34, 36 may be configured to fold up relative to the main section 32 to reduce the lateral width of the implement 10 to permit, for example, storage or transportation of the implement 10 on a road. However, in alternative embodiments, the frame 14 may include any suitable number of sections.

Additionally, in several embodiments, the frame 14 may be configured to support a cultivator 38, which may be configured to till or otherwise break the soil over which the implement 10 travels to create a seedbed. In this respect, the cultivator 38 may include a plurality of shanks 40, which are pulled through the soil as the implement 10 moves across the field in the direction of travel 12. As will be described below, in some embodiments, the shanks 40 may be pivotably mounted to the frame 14 to allow the shanks 40 pivot out of the way of rocks or other impediments in the soil. As shown, the shanks 40 may be spaced apart from one another longitudinally between the forward end 18 and the aft end 20 of the frame 14 and/or between the first side 22 and the second side 24 of the frame 14.

As shown in FIG. 1, the implement 10 may also include one or more harrows 42. In general, the harrow(s) 42 may be configured to be pivotably coupled to the frame 14. The harrow(s) 42 may include a plurality of ground-engaging elements 44, such as tines or spikes, configured to level or otherwise flatten any windrows or ridges in the soil created by the cultivator 38. Specifically, the ground-engaging elements 44 may be configured to be pulled through the soil as the implement 10 moves across the field in the direction of travel 12. However, in alternative embodiments, the implement 10 may include any other suitable number of harrows 42.

Moreover, in one embodiment, the implement 10 may include one or more baskets or rotary firming wheels 46. In general, the basket(s) 46 may be configured to reduce the number of clods in the soil and/or firm the soil over which the implement 10 travels. As shown, each basket 46 may be pivotably coupled to one of the harrows 42. Alternately, the basket(s) 46 may be pivotally coupled to the frame 14 or any other suitable location of the implement 10. However, in alternative embodiments, the implement 10 may include any other suitable number of baskets 46.

Figure 2:
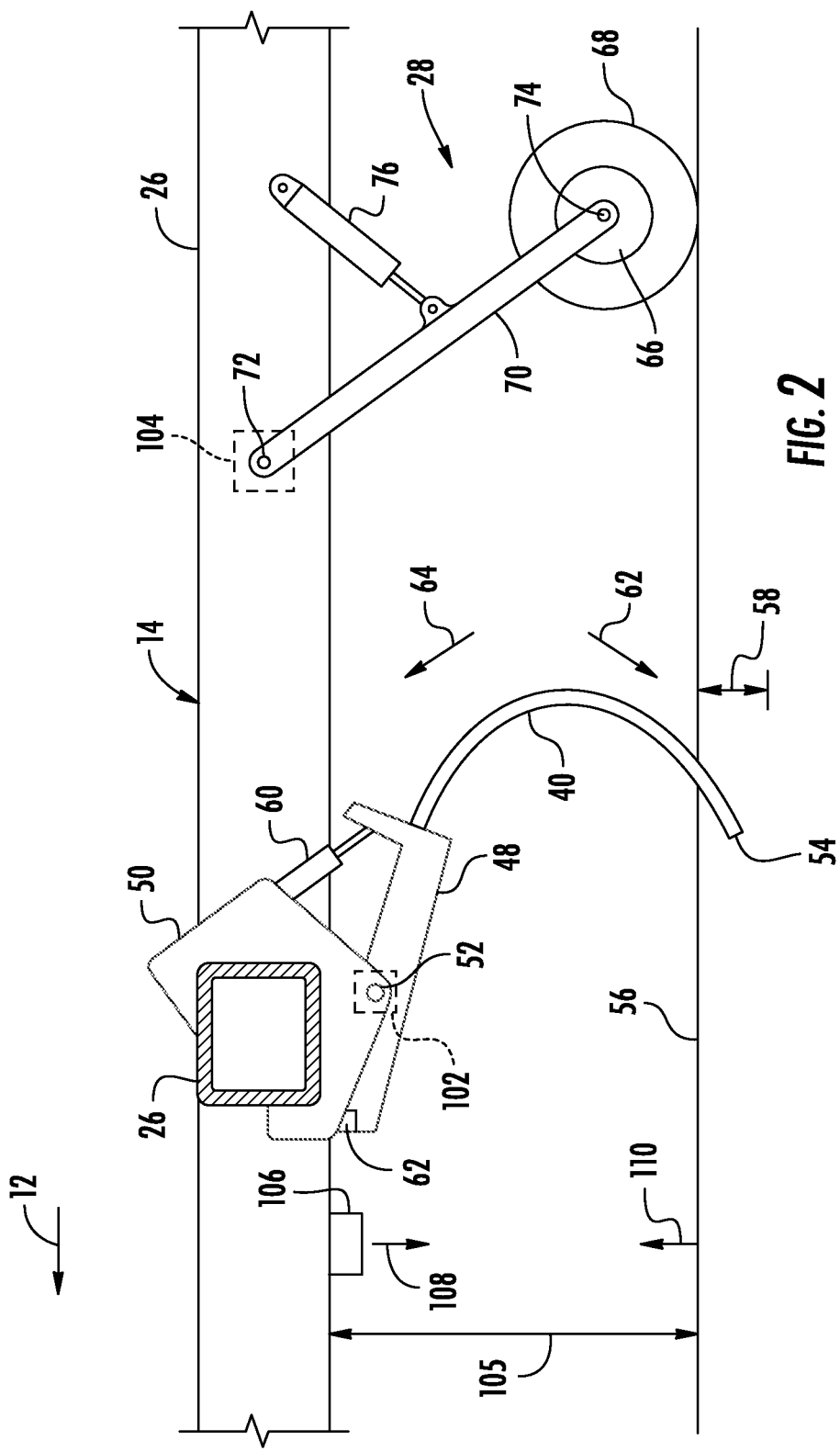
FIG. 2 illustrates a side view of one embodiment of a ground-engaging tool of an agricultural implement in accordance with aspects of the present subject matter.

Referring now to FIG. 2, a side view of one embodiment of a shank 40 is illustrated in accordance with aspects of the present subject matter. As shown in FIG. 2, the shank 40 may be coupled to the frame 14 of the implement 10 by a shank holder 48. Specifically, in several embodiments, the shank holder 48 may be pivotably coupled to a shank mounting bracket 50 (e.g., at a pivot joint 52), which is, in turn, coupled to one of the frame members 26 of the implement frame 14. The shank 40 may be coupled to and extend from the shank holder 48 along a curved or arcuate profile to a tip 54. The tip 54 may, in turn, be configured to penetrate a soil surface 56 of the field to a penetration depth (indicated by arrow 58) such that the shank 40 engages the soil as the implement 10 is being pulled through the field. However, in alternative embodiments, the shank 40 may be configured in any other suitable manner. For example, in one embodiment, the shank 40 may be rigidly coupled or bolted to the frame 14.

In several embodiments, a biasing element 60 may be coupled between the implement frame 14 and the shank 40. In this respect, the biasing element 60 may be configured to bias the shank 40 to a predetermined shank position (e.g., a home or base position) relative to the frame 14. In general, the predetermined shank position may correspond to a shank position in which the shank 40 penetrates the soil to a desired or specified penetration depth. In one embodiment, the predetermined shank position may be set by a mechanical stop 62. In operation, the biasing element 60 may permit relative movement between the shank 40 and the implement frame 14. For example, the biasing element 60 may be configured to bias the shank 40 to pivot relative to the frame 14 in a first pivot direction (indicated by arrow 62) until the shank holder 48 contacts the stop 62. The biasing element 60 may also allow the shank 40 to pivot away from the predetermined shank position (e.g., to a shallower depth of penetration), such as in a second pivot direction (as indicated by arrow 64) opposite the first pivot direction 62, when encountering rocks or other impediments in the field. As shown in FIG. 2, the biasing element 60 may be configured as a fluid-driven actuator, such as hydraulic or pneumatic cylinder. However, in alternative embodiments, the biasing element 60 may be configured as any other suitable biasing element, such as an electric linear actuator or a spring.

Moreover, in several embodiments, a tool position sensor 102 may be provided in operative association with the shank 40. In general, the tool position sensor 102 may be configured to capture data indicative of the position of the shank 40 relative to the implement frame 14. For example, in one embodiment, the tool position sensor 102 may correspond to a potentiometer positioned between the shank holder 48 and the frame 14, such as within the pivot joint 52. In such an embodiment, as the shank 40 is moved in the first and second pivot directions 62, 64, the voltage output by the tool position sensor 102 may vary, with such voltage being indicative of the position of the shank 40 relative to the frame 14. However, in other embodiments, the tool position sensor 102 may correspond to any other suitable sensor(s) and/or sensing device(s) configured to capture data associated with the position of the shank 40 relative to the implement frame 14. For instance, in one embodiment, the tool position sensor 102 may correspond to a fluid pressure sensor configured to capture data indicative of the fluid pressure within the biasing element 60, with such fluid pressure being associated with the position of the shank 40 relative to the implement frame 14.

Additionally, as shown in FIG. 2, a centrally-located wheel assembly 28 may be pivotally coupled to the implement frame 14. More specifically, the wheel assembly 28 may include a wheel 66 having a tire 68 mounted thereon. Moreover, the wheel assembly 28 may include a wheel arm 70 pivotally coupled to the implement frame 14 at a pivot joint 72 and pivotally coupled to the wheel 66 via an axle 74. Furthermore, in one embodiment, the wheel assembly 28 may include an actuator 76 coupled between the frame 24 and the wheel arm 70. In this respect, the actuator 76 may be configured to pivot the wheel arm 70 relative to the frame 14 such that the frame 14 is raised and lowered relative to the wheel/tire 66/68. Such adjustment of the frame 14 relative to the wheel/tire 66/68 may, in turn, adjust the penetration depth 58 of the shank 40. For example, raising the frame 14 relative to the wheel/tire 66/68 may decrease the penetration depth 58 of the shank 40. Conversely, lowering the frame 14 relative to the wheel/tire 66/68 may increase the penetration depth 58 of the shank 40. In the illustrated embodiment, the actuator 76 is configured as a fluid-driven actuator, such as hydraulic or pneumatic cylinder. However, in alternative embodiments, the biasing actuator 76 may be configured as any other suitable actuator, such as an electric linear actuator. In addition, in alternative embodiments, wheel assembly 28 may be configured in any other suitable manner.

In several embodiments, a wheel position sensor 104 may be provided in operative association with the wheel assembly 28. In general, the wheel position sensor 104 may be configured to capture data indicative of the position of the wheel/tire 66/68 relative to the implement frame 14. For example, in one embodiment, the wheel position sensor 104 may correspond to a potentiometer positioned at the between the wheel arm 70 and the frame 14, such as within the pivot joint 72. In such an embodiment, as the frame 14 is raised and lowered relative to the wheel/tire 66/68, the voltage output by the wheel position sensor 104 may vary, with such voltage being indicative of the position of the wheel/tire 66/68 relative to the frame 14. However, in other embodiments, the wheel position sensor 104 may correspond to any other suitable sensor(s) and/or sensing device(s) configured to capture data associated with the position of the wheel/tire 66/68 relative to the implement frame 14. For instance, in one embodiment, the wheel position sensor 104 may correspond to a linear transducer configured to capture data indicative of the extension and/or retraction of a rod of the actuator 76 relative to a cylinder of the actuator 76.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

In accordance with aspects of the present subject matter, one or more frame position sensors 106 may be installed on or otherwise provided in operative association with the frame 14 of the implement 10. In general, the frame position sensor(s) 106 may be configured to capture data indicative of a distance (indicated by arrow 105) between the frame 14 and the surface 56 of the field. As will be described below, a controller may be configured to receive the data captured by the frame position sensor(s) 106 and use such received data to calibrate one or more determined values of the penetration depth(s) of a ground-engaging tool(s) (e.g., a shank(s) 40) of the implement 10.

In several embodiments, the frame position sensor(s) 106 may be configured as a suitable non-contact-based sensor(s), such as an ultrasonic sensor(s), a radio detection and ranging (RADAR) sensor(s), or a light detection and ranging (LIDAR) sensor(s). Specifically, in such embodiments, the frame position sensor(s) 106 may be configured to emit one or more output signals (indicated by arrow 108), such as a radio, microwave, or acoustic output signal(s), directed toward the surface 56 of the field. The output signal(s) 108 (or a portion thereof) may, in turn, be reflected by the surface 56 of the field as echo or return signal(s) (indicated by arrow 110). Moreover, the frame position sensor(s) 106 may be configured to receive the reflected echo signal(s) 110. In this regard, the time of flight, amplitude, frequency, and/or phase of the received echo signal(s) 110 may be indicative of the distance 105 between the frame 14 and the surface 56 of the field. However, in alternative embodiments, the frame position sensor(s) 106 may be configured as any other suitable types of sensor(s) or sensing device(s) configured capture data indicative of the distance between the frame 14 and the surface 56 of the field, such as a mechanical or contact-based sensor(s).

The frame position sensor(s) 106 may be installed on the implement frame 14 at any suitable location(s). Specifically, in several embodiments, the frame position sensor(s) 106 may be installed on one or more of the frame members 26 of the frame 28 such that the output signals 108 are directed at a portion of the field surface 56 in which little or no soil flow is present. For example, in such embodiments, the frame position sensor(s) 106 may be positioned forward of the ground-engaging tool(s) (e.g., the shank(s) 40) relative to the direction of travel 12. However, in alternative embodiments, the frame position sensor(s) 106 may be positioned at any other suitable location(s) on the implement 10.

Additionally, any suitable number of frame position sensor(s) 106 may be installed on the implement frame 14. For example, in one embodiment, one frame position sensor 106 may be installed on each section (e.g., the main section 32 and the wing sections 34, 36) of the frame 14. However, in alternative embodiments, one, two, or four or more frame position sensors 106 may be installed on the frame 14.

Figure 3:
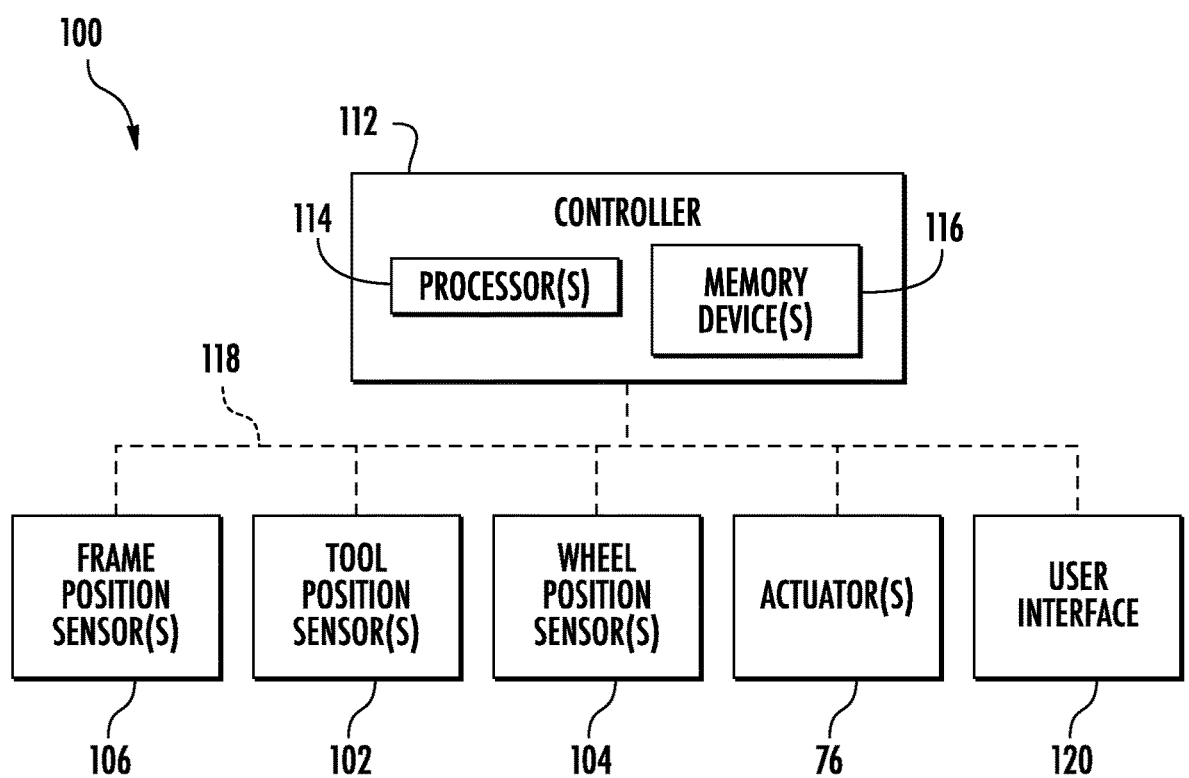
FIG. 3 illustrates a schematic view of one embodiment of a system for calibrating tool depth of an agricultural implement in accordance with aspects of the present subject matter.

Referring now to FIG. 3, a schematic view of one embodiment of a system 100 for calibrating tool depth of an agricultural implement is illustrated in accordance with aspects of the present subject matter. In general, the system 100 will be described herein with reference to the agricultural implement 10 described above with reference to FIGS. 1 and 2. However, it should be appreciated by those of ordinary skill in the art that the disclosed system 100 may generally be utilized with agricultural implements having any other suitable implement configuration.

As shown in FIG. 3, the system 100 may include a controller 112 positioned on and/or within or otherwise associated with the implement 10 or an associated work vehicle (not shown). In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 116 may generally be configured to store suitable computer-readable instructions that, when implemented by the processor(s) 114, configure the controller 112 to perform various computer-implemented functions.

In addition, the controller 112 may also include various other suitable components, such as a communications circuit or module, a network interface, one or more input/output channels, a data/control bus and/or the like, to allow controller 112 to be communicatively coupled to any of the various other system components described herein (e.g., the actuators 76 and/or the sensors 102, 104, 106). For instance, as shown in FIG. 3, a communicative link or interface 118 (e.g., a data bus) may be provided between the controller 112 and the components 76, 102, 104, 106 to allow the controller 112 to communicate with such components 76, 102, 104, 106 via any suitable communications protocol (e.g., CAN-BUS).

The controller 112 may correspond to an existing controller(s) of the implement 10 and/or an associated work vehicle, itself, or the controller 112 may correspond to a separate processing device. For instance, in one embodiment, the controller 112 may form all or part of a separate plug-in module that may be installed in association with the implement 10 and/or the vehicle to allow for the disclosed systems to be implemented without requiring additional software to be uploaded onto existing control devices of the implement 10 and/or the vehicle. The functions of the controller 112 may be performed by a single processor-based device or may be distributed across any number of processor-based devices, in which instance such devices may be considered to form part of the controller 112. For instance, the functions of the controller 108 may be distributed across multiple application-specific controllers, such as an implement controller, a vehicle controller, and/or the like.

Furthermore, in one embodiment, the system 100 may also include a user interface 120. More specifically, the user interface 120 may be configured to receive inputs (e.g., an input associated with the set or desired penetration depth of the ground-engaging tool(s) of the implement 10) from the operator of the implement 10. As such, the user interface 120 may include one or more input devices (not shown), such as touchscreens, keypads, touchpads, knobs, buttons, sliders, switches, mice, microphones, and/or the like, which are configured to receive user inputs from the operator. The user interface 120 may, in turn, be communicatively coupled to the controller 112 via the communicative link 118 to permit the inputs to be transmitted from the user interface 120 to the controller 112. In addition, some embodiments of the user interface 120 may include one or more feedback devices (not shown), such as display screens, speakers, warning lights, and/or the like, which are configured to provide feedback from the controller 112 to the operator.

In several embodiments, the controller 112 may be configured to determine penetration depth values of one or more ground-engaging tools of the implement 10. Specifically, prior to the performance of an agricultural operation (e.g., a tillage operation), the operator of the implement 10 may adjust or otherwise set the position(s) of the ground-engaging tool(s) relative to the implement frame 14 such that the tool(s) penetrate the surface of the field to a desired or specified penetration depth. Such tool(s) may include the shank(s) 40, the ground-engaging elements 44, disk blades (not shown), leveling blades (not shown), and/or the like. After the penetration depth(s) of the ground-engaging tool(s) is set, the controller 112 may be configured to receive one or more inputs indicative of the desired or specified penetration depth(s). Thereafter, the controller 112 may be configured to determine or calculate the desired penetration depth value(s) for the ground-engaging tool(s). Additionally, in one embodiment, the two or more of the ground-engaging tool(s) of the implement 10 may be set at differing penetration depths. In such an embodiment, the controller 112 may be configured to determine differing penetration depth values for such tools.

In some embodiments, the controller 112 may be configured to determine the penetration depth value(s) based on the position(s) of the wheel assemblies 28 relative to the implement frame 14. As mentioned above, the system 100 may include one or more wheel position sensors 104 configured to capture data indicative of the position(s) of the wheel(s)/tire(s) 66/68 of the wheel assemblies 28 relative to the frame 14. In this regard, as the implement 10 travels across the field to perform the agricultural operation thereon, the controller 112 may be configured to receive data from the wheel position sensor(s) 104 (e.g., via the communicative link 118). Thereafter, the controller 112 may be configured to process/analyze the received data to determine or estimate the penetration depth value(s) of the ground-engaging tool(s) of the implement 10. For instance, the controller 112 may include a look-up table(s), suitable mathematical formula, and/or algorithms stored within its memory device(s) 116 that correlates the received wheel position sensor data to the penetration depth value(s) of the ground-engaging tool(s).

In another embodiment, controller 112 may be configured to determine the penetration depth value(s) based on an operator input. More specifically, after setting the penetration depth(s) of the ground-engaging tool(s), the operator may interact with the input devices of the user interface 120 to provide an input indicative of the desired penetration depth value(s) of ground-engaging tool(s). The received input may be transmitted from the user interface 120 to the controller 112 (e.g., via the communicative link 118). As such, the input from the operator received by the controller 112 may be the desired penetration depth value(s) of ground-engaging tool(s) or permit the controller 112 to determine or calculate such desired penetration depth value(s). However, in alternative embodiments, the controller 112 may be configured to determine the desired penetration depth value(s) based on any other suitable received input.

In general, the determined penetration depth value(s) of ground-engaging tool(s) are determined generally based on the distance(s) between the wheels/tires 66/68 of the implement 10 and the frame 14. In this respect, the determined penetration depth value(s) typically rely on the assumption that the distance between the wheels/tires 66/68 and the frame 14 is the same as the distance between the surface of the field and the frame 14. However, as the implement 10 travels across the field to perform the agricultural operation thereon, the soil within the field may exert a downward force on the ground-engaging tool(s). This force may, in turn, compress or otherwise enlarge the contact patch of the tires 68 and/or pull otherwise cause the wheels/tires 66/68 to sink into the soil. The tire compression and/or wheel/tire sinking may cause the distance(s) between the wheels/tires 66/68 and the frame 14 to be less than the corresponding distance(s) between the surface of the field and the frame 14 such that the determined penetration depth value(s) may be shallower than the actual penetration depth(s) of the tools(s).

In accordance with aspects of the present subject matter, the controller 112 may be configured to calibrate the determined penetration depth value(s) based on one or more correction factors. Specifically, in several embodiments, the controller 112 may be configured to determine the correction factor(s) based on the distance(s) between the implement frame 14 and the soil surface of the field. As mentioned above, the system 100 may include one or more frame position sensors 106 configured to capture data indicative of the distance(s) between the implement frame 14 and the soil surface of the field. In this regard, as the implement 10 travels across the field to perform the agricultural operation thereon, the controller 112 may be configured to receive data from the frame position sensor(s) 106 (e.g., via the communicative link 118). The controller 112 may be configured to process/analyze the received data to determine or estimate the distance(s) between the implement frame 14 and the soil surface of the field. For instance, the controller 112 may include a look-up table(s), suitable mathematical formula, and/or algorithms stored within its memory device(s) 116 that correlates the received frame position sensor data to the distance(s) between the implement frame 14 and the soil surface of the field. Moreover, the controller 112 may be configured to determine the correction factor(s) based on the determined distance(s). Thereafter, the controller 112 the controller 112 may be configured to adjust the determined penetration depth value(s) based on the determined correction factor(s) to calibrate penetration depth value(s).

In some embodiments, such as when the ground-engaging tool(s) is rigidly coupled to the frame 14, the correction factor(s) may be determined based solely on the distance(s) between the implement frame 14 and the soil surface of the field. However, in other embodiments, such as when the ground-engaging tool(s) are adjustably coupled to the frame 14, the controller 112 may be configured to determine the correction factor(s) based on the position(s) of the ground-engaging tool(s) relative to the frame 14 in addition to the distance(s) between the implement frame 14 and the soil surface of the field. As mentioned above, the system 100 may include one or more tool position sensors 102 configured to capture data indicative of the position(s) of the ground-engaging tool(s) relative to the frame 14. In this respect, as the implement 10 travels across the field to perform the agricultural operation thereon, the controller 112 may be configured to receive data from the tool position sensor(s) 102 (e.g., via the communicative link 118). The controller 112 may be configured to process/analyze the received data to determine or estimate the position(s) of the ground-engaging tool(s) relative to the frame 14. For instance, the controller 112 may include a look-up table(s), suitable mathematical formula, and/or algorithms stored within its memory device(s) 116 that correlates the received tool position sensor data to the position(s) of the ground-engaging tool(s) relative to the frame 14. Thereafter, the controller 112 may be configured to determine the correction factor(s) based on the determined position(s) of the ground-engaging tool(s) relative to the frame 14 and the determined distance(s) between the implement frame 14 and soil surface.

The controller 112 may be configured to determine the correction factor(s) and adjust the determined penetration depth value(s) based on such correction factor(s) in any suitable manner. In one embodiment, the determined correction factor(s) may correspond to a single numerical value(s) that is mathematically combined with (e.g., added to or subtracted from) the determined penetration depth value(s) of the ground-engaging tool(s). For example, in such an embodiment, the controller 112 may be configured to access one or more look-up tables stored within its memory device(s) 116. The look-up table(s) may, in turn, provide a correction factor(s) for the determined penetration depth value(s). In another embodiment, the controller 112 may be configured to calculate the correction factor(s) from the determined distance(s) between the implement frame 14 and soil surface (s) and/or the position(s) of the ground-engaging tool(s) relative to the frame 14 using one or more mathematical formula stored within its memory device(s) 116. However, in alternative embodiments, the controller 112 may be configured to determine the correction factor(s) in any other suitable manner. For instance, the controller 112 may determine the correction factor(s) using one or more suitable algorithms that modify the determined penetration depth value(s) in a more complex manner.

Moreover, the controller 112 may be configured to determine any suitable number of correction factors. For example, as mentioned above, in one embodiment, a frame position sensor 106 may be installed on each section of the implement frame 14 such that the controller 112 is able to determine the distance between each frame section and the soil surface. In such an embodiment, the controller 112 may be configured to determine a correction value for the determined penetration depth value(s) of the tool(s) supported on each frame section. However, in alternative embodiments, the controller 112 may be configured to determine a single correction factor for all of the determined penetration depth value(s) or any other suitable number of correction factor(s).

In one embodiment, the controller 112 may be configured to provide a notification to the operator of the implement 10 associated with the calibrated penetration depth value(s). For instance, in such an embodiment, the controller 112 may be configured to transmit instructions to the user interface 120 (e.g. via the communicative link 118) instructing the user interface 120 to provide a notification to the operator (e.g., by causing a visual or audible notification or indicator to be presented to the operator) that provides an indication that the calibrated penetration depth value(s). The operator may then choose to initiate any suitable corrective action he/she believes is necessary, such as manually adjusting the penetration depth(s) of the ground-engaging tool(s).

Additionally, the controller 112 may be configured to initiate one or more control actions based on the calibrated penetration depth value(s). Specifically, in several embodiments, the controller 112 may be configured to compare the calibrated penetration depth value(s) of the ground-engaging tool(s) to an associated predetermined penetration depth range. Thereafter, when the calibrated penetration depth value(s) falls outside of the associated predetermined penetration depth range (thereby indicating the penetration depth(s) of the tool(s) may need to be adjusted), the controller 112 may be configured to adjust one or more operating parameters of the implement 10 associated with the penetration depth(s) of the ground-engaging tool(s). For example, in one embodiment, the controller 112 may be configured to control the operation of the actuators 76 associated with the wheel assemblies 28 such that the penetration depth(s) of the ground-engaging tool(s) is adjusted. In such an embodiment, the controller 112 may be configured to transmit instructions to the actuators 76 instructing such actuators 76 to adjust the position of the implement frame 14 relative to the wheels/tires 66/68 such that the penetration depth(s) of the tool(s) are adjusted. However, in alternative embodiments, the controller 112 may be configured to initiate any other suitable control actions based on the calibrated penetration depth value(s).

Figure 4:
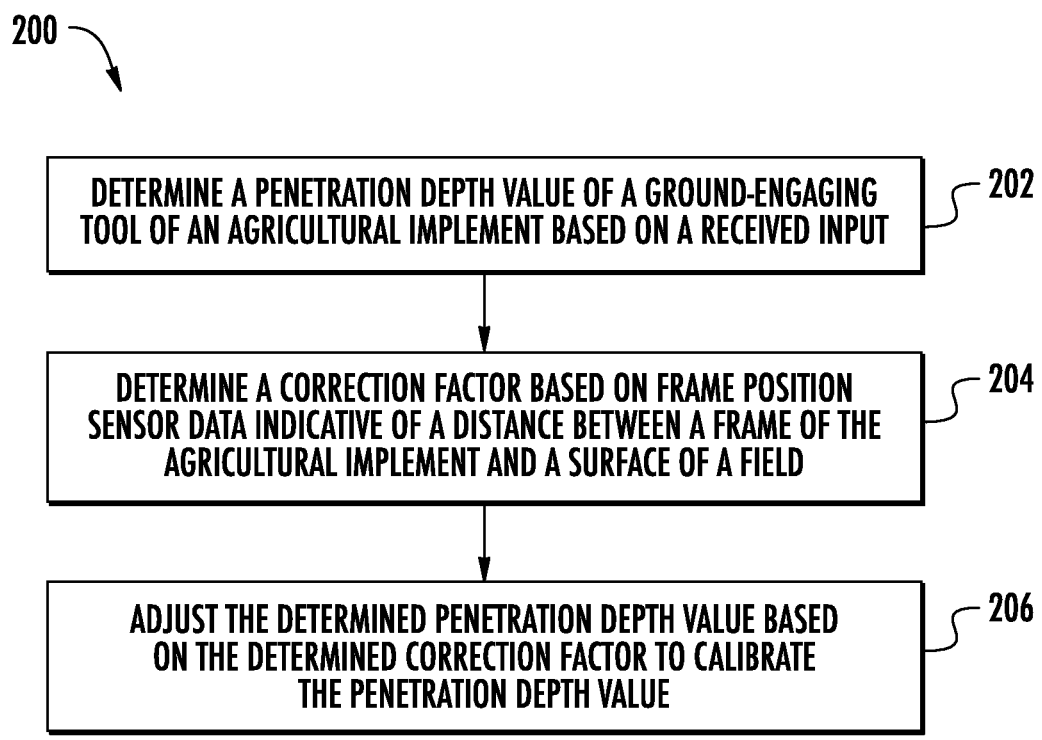
FIG. 4 illustrates a flow diagram of one embodiment of a method for calibrating tool depth of an agricultural implement in accordance with aspects of the present subject matter.

Referring now to FIG. 4, a flow diagram of one embodiment of a method 200 for calibrating tool depth as an agricultural implement is illustrated in accordance with aspects of the present subject matter. In general, the method 200 will be described herein with reference to the agricultural implement 10 and the system 100 described above with reference to FIGS. 1-3. However, it should be appreciated by those of ordinary skill in the art that the disclosed method 200 may generally be implemented with any agricultural implement having any suitable implement configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include determining, with one or more computing devices, a penetration depth value of a ground-engaging tool of an agricultural implement based on a received input. For instance, as described above, the controller 112 may be configured to determine a penetration depth value of a ground-engaging tool (e.g., a shank 40) of the agricultural implement 10 based on a received input (e.g., an input received from a wheel position sensor 104 or a user interface 120).

Additionally, at (204), the method 200 may include determining, with the one or more computing devices, a correction factor based on frame position sensor data indicative of a distance between a frame of the agricultural implement and a surface of a field. For instance, as described above, the controller 112 may be configured to determine a correction factor for the determined penetration depth value based on data indicative of the distance between a frame 14 of the implement 10 and the surface 56 of the field received from a frame position sensor 106.

Moreover, as shown in FIG. 4, at (206), the method 200 may include adjusting, with the one or more computing devices, the determined penetration depth value based on the determined correction factor to calibrate the penetration depth value. For instance, as described above, the controller 112 may be configured to adjust the determined penetration depth value based on the determined correction factor to calibrate the penetration depth value.

It is to be understood that the steps of the method 200 are performed by the controller 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 112 described herein, such as the method 200, is implemented in software code or instructions which are tangibly stored on a tangible computer readable medium. The controller 112 loads the software code or instructions via a direct interface with the computer readable medium or via a wired and/or wireless network. Upon loading and executing such software code or instructions by the controller 112, the controller 112 may perform any of the functionality of the controller 112 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for calibrating tool depth as an agricultural implement is moved across a field, the system comprising:
   an implement frame;
   a ground-engaging tool supported on the implement frame, the ground-engaging tool configured to penetrate soil present within the field to a penetration depth;
   a frame position sensor configured to capture data indicative of a distance between the implement frame and a surface of the field; and
   a controller communicatively coupled to the frame position sensor, wherein the controller:
   receives an operator-specified penetration depth value of the ground-engaging tool via an operator input;
   determines the distance between the implement frame and the surface of the field based on the data captured by the frame position sensor;
   determines a correction factor based on the determined distance between the implement frame and the surface of the field; and
   adjusts the operator-specified penetration depth value based on the determined correction factor such that the adjusted operator-specified penetration depth value corresponds to an actual penetration depth value.

2. The system of claim 1, wherein the ground-engaging tool is adjustably coupled to the implement frame, the system further comprising:
   a tool position sensor configured to capture data indicative of a position of the ground-engaging tool relative to the implement frame, the controller communicatively coupled to the tool position sensor, wherein the controller further determines the correction factor based on the data captured by the tool position sensor and the determined distance between the implement frame and the surface of the field.

3. The system of claim 1, wherein the controller provides a notification associated with the adjusted operator-specified penetration depth value.

4. The system of claim 1, wherein the frame position sensor is coupled to the implement frame forward of the ground-engaging tool relative to a direction of travel of the implement frame.

5. The system of claim 1, wherein the frame position sensor comprises a non-contact-based sensor.

6. The system of claim 1, wherein the frame position sensor comprises a RADAR sensor, a LIDAR sensor, or an ultrasonic sensor.

7. The system of claim 1, wherein the ground-engaging tool comprises a shank.

8. A tillage implement, comprising:
   a frame;
   a plurality of wheels adjustably coupled to the frame;
   a first ground-engaging tool supported on the frame, the first ground-engaging tool configured to penetrate soil present within the field to a first penetration depth;
   a frame position sensor configured to capture data indicative of a distance between the frame and a surface of the field; and
   a controller communicatively coupled to the frame position sensor, wherein the controller:
   receives an operator-specified first penetration depth value of the first ground-engaging tool via a first operator input;
   determines the distance between the implement frame and the surface of the field based on the data captured by the frame position sensor;
   determines a correction factor based on the determined distance between the implement frame and the surface of the field; and
   adjusts the operator-specified first penetration depth value based on the determined correction factor such that the adjusted operator-specified first penetration depth value corresponds to a first actual penetration depth value.

9. The tillage implement of claim 8, further comprising:
   a second ground-engaging tool supported on the frame, the second ground-engaging tool configured to penetrate the soil present within the field to a second penetration depth, the second penetration depth being different than the first penetration depth, wherein the controller:
   receives an operator-specified second penetration depth value of the second ground-engaging tool via a second operator input; and
   adjusts the operator-specified second penetration depth value based on the determined correction factor such that the adjusted operator-specified second penetration depth value corresponds to a second actual penetration depth value.

10. The tillage implement of claim 8, wherein the first ground-engaging tool comprises a shank.

11. A method for calibrating tool depth as an agricultural implement is moved across a field, the agricultural implement including a frame and a ground-engaging tool supported on the frame, the ground-engaging tool configured to penetrate soil present within the field to a penetration depth, the method comprising:

receiving, with one or more computing devices, an operator-specified penetration depth value of the ground-engaging tool via an operator input;

receiving, with the one or more computing devices, frame position sensor data indicative of a distance between the frame and a surface of the field;

determining, with the one or more computing devices, a correction factor based on the determined distance between the frame and the surface of the field; and adjusting, with the one or more computing devices, the operator-specified penetration depth value based on the determined correction factor such that the adjusted operator-specified penetration depth value corresponds to an actual penetration depth value.

12. The method of claim 11, wherein:

the ground-engaging tool is adjustably coupled to the implement frame; and determining the correction factor comprises determining, with the one or more computing devices, the correction factor based on tool position sensor data indicative of a position of the ground-engaging tool relative to the frame and the determined distance between the frame and the surface of the field.

13. The method of claim 11, further comprising:

providing, with the one or more computing devices, a notification to an operator of the agricultural implement associated with the adjusted operator-specified penetration depth value.

* * * * *